United States Patent
Etheridge, III et al.

(10) Patent No.: US 7,085,038 B1
(45) Date of Patent: Aug. 1, 2006

(54) APPARATUS HAVING A PHOTONIC CRYSTAL

(75) Inventors: Herbert Thomas Etheridge, III, Corvallis, OR (US); Henry Lewis, Corvallis, OR (US); Carol McConica, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/046,586

(22) Filed: Jan. 28, 2005

(51) Int. Cl.
*G02B 1/00* (2006.01)

(52) U.S. Cl. ............... 359/321; 359/237; 359/238
(58) Field of Classification Search .......... 359/321, 359/237, 238, 240, 245, 252
See application file for complete search history.

(56) References Cited

U.S. PATENT DOCUMENTS

| | | | |
|---|---|---|---|
| 6,768,256 B1 | 7/2004 | Fleming | 150/189 |
| 6,829,421 B1 | 12/2004 | Forbes | 385/125 |
| 6,842,205 B1 * | 1/2005 | Kurasawa | 349/96 |
| 6,845,204 B1 | 1/2005 | Broeng | 385/126 |
| 2003/0057417 A1 * | 3/2003 | Lee et al. | 257/40 |
| 2003/0231397 A1 | 12/2003 | Shirane | 359/586 |
| 2004/0086661 A1 * | 5/2004 | Yli-Urpo et al. | 427/595 |

FOREIGN PATENT DOCUMENTS

WO    WO 2004/049764    6/2004

OTHER PUBLICATIONS

Lin, Shawn et al; "Silicon Three-dimensional Photonic Crystal and its Applications"; Sandia National Laboratories; Nov. 2001; Sandia Report, USA; 29 pages.

Moon; Fabrication of Ordered Macroporous Cylinders by Colloidal Templating in Microcapillaries; Langmuir 2004, vol. 20, No. 5, p. 2033-2035.

Wong; Colloidal Crystal Films: Advances in University and Perfection; JACS Articles 2003, vol. 125, No. 50, p. 15589-15598.

Jiang; Single-Crystal Colloidal Multilayers of Controlled Thickness; Chem.Mater. 1999, vol. 11, No. 8, p. 2132-2140.

(Continued)

*Primary Examiner*—Timothy Thompson

(57) ABSTRACT

An apparatus, including a substrate, where at least a portion of the substrate has a convex surface, and a photonic crystal disposed over the convex surface. The photonic crystal is substantially conformal to at least a portion of the convex surface.

67 Claims, 6 Drawing Sheets

OTHER PUBLICATIONS

King; High-filling-fraction inverted ZnS opals fabricated by atomic layer deposition; Applied Physics Letters, Sep. 29, 2003, vol. 83, No. 13, p. 2566-2568.

Romanov, Enhancement of the photonic gap of opal-based three-dimensional gratings; Applied Physics Letters, Apr. 21, 1997, vol. 70, No. 16, p. 2091-2093.

vonFreymann; Tungsten inverse opals: The influence of absorption on the photonic band structure in the visible spectral reg.; Appl. Phys Ltrs, Jan. 12, 2004, vol. 84, No. 12, p. 224-226.

Rugge; Tungsten Nitride Inverse Opals by Atomic Layer Deposition; Nano Letters, 2003, vol. 3, No. 9, p. 1293-1297.

Klaus; Atomic layer deposition of tungsten using sequential surface chemistry with a sacrificial stripping reaction; Thin Solid Films 360, 2000, p. 145-153.

Crowell; Chemical methods of thin film deposition: Chemical vapor deposition, atomic layer deposition, and related technologies; JVST, Sep./Oct. 2003, vol. 21, No. 5, p. S88-S95.

* cited by examiner

US 7,085,038 B1

APPARATUS HAVING A PHOTONIC CRYSTAL

CROSS-REFERENCE TO RELATED APPLICATION

This application is related to co-pending and commonly assigned application Ser. No. 11/046,587 filed on the same day herewith by Herbert T. Etheridge III, Henry D. Lewis and Carol M. McConica and entitled "Apparatus Having a Photonic Crystal."

BACKGROUND

Description of the Art

As the demand for cheaper and higher performance electronic devices continues to increase there is a growing need to develop higher yield lower cost manufacturing processes for electronic devices especially in the area of optical devices. In particular there is a demand for higher performance as well as improved efficiency in lighting technology.

Although incandescent lamps are inexpensive and the most widely utilized lighting technology in use today, they are also the most inefficient lighting source in regards to the amount of light generated per unit of energy consumed. An incandescent lamp works by heating a filament, typically tungsten, to a very high temperature so that it radiates in the visible portion of the electromagnetic spectrum. Unfortunately, at such high temperatures the filament radiates a considerable amount of energy in the non-visible infrared region of the electromagnetic spectrum.

If these problems persist, the continued growth and advancements in the use of opto-electronic devices, especially in the area of photonic crystals, in various electronic products, will be reduced. In areas like consumer electronics, the demand for cheaper, smaller, more reliable, and higher performance electronics constantly puts pressure on improving and optimizing performance of ever more complex and integrated devices. The ability to optimize lighting performance efficiency will open up a wide variety of applications that are currently either impractical, or are not cost effective.

BRIEF DESCRIPTION OF THE DRAWINGS

FIG. 1b is a cross-sectional view of a portion of the substrate shown in FIG. 1a.

FIG. 2b is a cross-sectional view along 2b—2b of the colloidal crystal shown in FIG. 2a.

FIG. 3b is a cross-sectional view along 3b—3b of the colloidal crystal shown in FIG. 3a.

DESCRIPTION OF THE PREFERRED EMBODIMENTS

This invention is directed to various photonic structures utilizing colloidal crystals. The present invention includes a wide variety of photonic structures formed on, over or both on and over curved surfaces including, for example, wires and fiber optic cables. Photonic crystals, typically, are spatially periodic structures having useful electromagnetic wave properties, such as photonic band gaps. Photonic crystals, for example, having the proper lattice spacing, offer the potential of improving the luminous efficacy of an incandescent lamp by modifying the emissivity of the tungsten filament. Such a filament, incorporated into a photonic crystal or encircled or surrounded by a photonic crystal, would emit a substantial fraction of its radiation in the visible portion of the spectrum and little or no light in the non-visible portions such as the infrared portion of the electromagnetic spectrum. Since many filaments, including spirally wound filaments, utilized as incandescent sources have a large degree of cylindrical symmetry the ability to form photonic crystals on curved surfaces provides for simpler manufacturing processes to make incandescent light sources, having a lower cost, and a higher luminous efficiency. In addition, such a colloidal crystal may also be formed on an optical fiber to deter loss of light at desired wavelengths.

It should be noted that the drawings are not true to scale. Further, various elements have not been drawn to scale. Certain dimensions have been exaggerated in relation to other dimensions in order to provide a clearer illustration and understanding of the present invention. In particular, vertical and horizontal scales may differ and may vary from one drawing to another. In addition, although some of the embodiments illustrated herein are shown in two dimensional views with various regions having height and width, it should be clearly understood that these regions are illustrations of only a portion of a device that is actually a three dimensional structure. Accordingly, these regions will have three dimensions, including length, width, and height, when fabricated on an actual device.

Moreover, while the present invention is illustrated by various embodiments, it is not intended that these illustrations be a limitation on the scope or applicability of the present invention. Further, it is not intended that the embodiments of the present invention be limited to the physical structures illustrated. These structures are included to demonstrate the utility and application of the present invention to presently preferred embodiments.

Figure 1A:
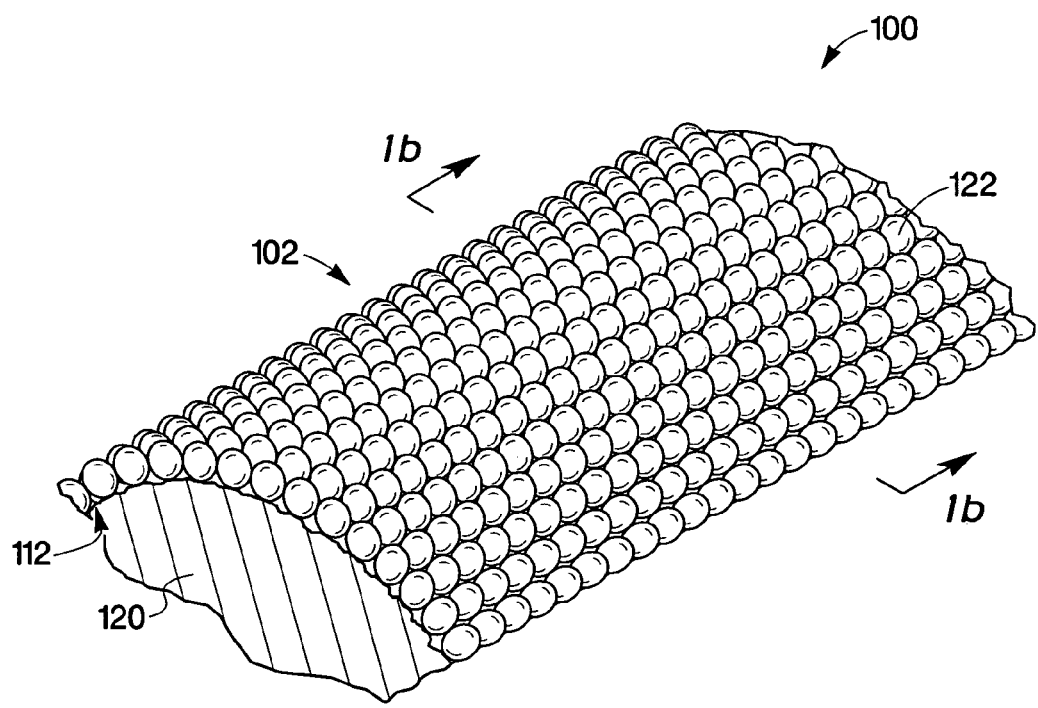
FIG. 1a is a perspective view of a portion of a substrate having spheres disposed thereon according to an embodiment of the present invention.
Figure 1B:
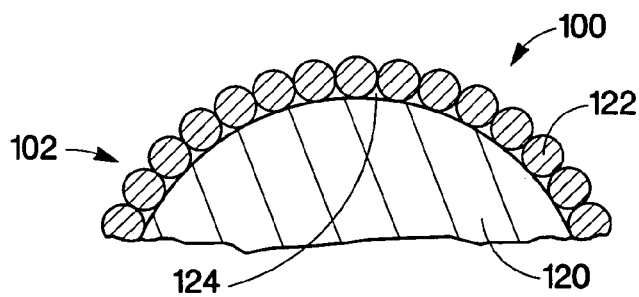
Figure 1C:
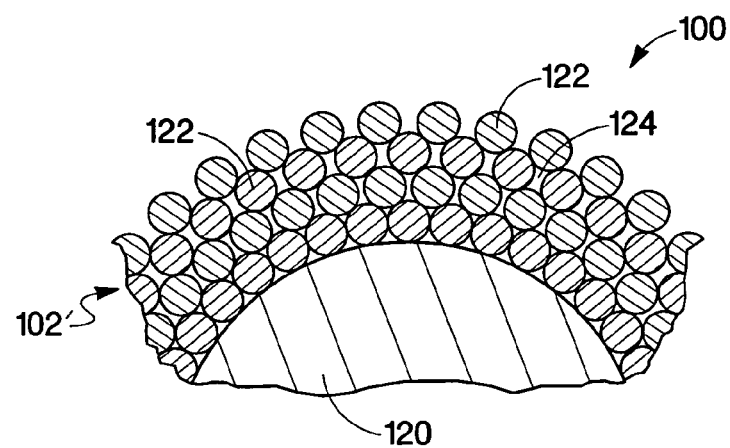
FIG. 1c is a cross-sectional view of a portion of a substrate according to an alternate embodiment of the present invention.

An embodiment of apparatus 100 employing the present invention is illustrated, in a perspective view, in FIG. 1a. In this embodiment, apparatus 100 includes substrate 120 that includes at least a portion of the substrate forming convex surface 112 over which photonic crystal 102 is disposed. In addition, the photonic crystal is formed substantially conformal to convex surface 112 as illustrated in the cross-sectional view along 1b—1b in FIG. 1b. In this embodiment, spheres 122 may be disposed on any substrate having essentially a convex surface. Examples of such substrate structures include, but are not limiting as to the nature of the present invention, rod-like substrates, cylindrically shaped substrates, tubularly shaped substrates, conically shaped substrates, and substrates having a closed surface such as the outer surface of a sphere. In still other embodiments, various layers such as an adhesive layer or other layer having particular optical or dielectric properties may be disposed between substrate 120 and photonic crystal 102. Photonic crystal 102, as illustrated in FIGS. 1a–1c is what is commonly referred to as a colloidal crystal or opaline crystalline array. The colloidal crystal is formed utilizing spheres 122. In alternate embodiments, photonic crystal 102 may also form what is commonly referred to as an inverse opal structure where interstitial volume 124 between the spheres is infiltrated and filled with a second material with the optional subsequent removal of spheres 122. Typically, the optional removal of the spheres after infiltration is completed will depend on whether the interstitial material has a higher refractive index than the spheres. In those cases where it is higher then the spheres need not, but may, still be removed. Generally, photonic crystal 102 will be formed utilizing multiple layers of spheres having typically a close-packed geometry, as illustrated in a cross sectional view in FIG. 1c, forming a face centered cubic crystalline structure (FCC), a hexagonal close packed structure (HCP), or other randomly stacked polycrystalline structure with each sphere predominantly touching six other spheres in one layer. However, in alternate embodiments other structures also may be utilized including, for example, simple cubic, body centered cubic and tetragonal packing. Further, in some embodiments, a single layer of spheres may be desirable. In those embodiments, utilizing multiple layers photonic crystal 102', as shown in FIG. 1c, may also form a photonic band gap crystal. Substrate 120, in this embodiment, may be formed from any material that has the desired optical, chemical, and mechanical properties for utilization in apparatus 100. For example, in one embodiment, substrate 120 may be formed from various glasses for those applications desiring substantial transparency in the visible portion of the electromagnetic spectrum. In a second embodiment, substrate 120 may be a metal wire such as tungsten or a tungsten alloy for those applications desiring substantial emission in the infrared or visible portion of the electromagnetic spectrum (e.g. an incandescent source heated to a high temperature). Any metal or alloy may be utilized the particular material chosen will depend on the particular portion of the spectrum to be used and the desired intensity. In still other embodiments, substrate 120 may be a fiber in, for example, a fiber optic application or substrate 120 may be utilized as an optical component such as a rod lens. Such fibers and optical components may be formed from various glasses, polymers or any other appropriate material having the desired optical properties for the particular application in which it will be utilized. Spheres 122, in this embodiment, may be formed from any material that is formable into spheres and provides the desired dielectric constant for the particular application in which the photonic crystal is utilized. The size of the spheres generally ranges from a few microns in diameter to a few nanometers in diameter. Both the particular material utilized to form spheres 122 and the size of the spheres will depend on the particular optical properties of the photonic crystal utilized in apparatus 100. For example, silica or polymer spheres may be utilized in those applications desiring a reduction in light lost as it propagates along an optical fiber. Another example is the use of metal spheres to form high temperature filaments for emitting light in the infrared and/or visible portions of the electromagnetic spectrum. Still another example is to use spheres having a differential solubility over an infiltration material to form inverse opal structures such as silica spheres removed by hydrofluoric acid in a tungsten inverse opal structure. Further, the photonic crystal may be formed utilizing spheres having different sizes. A wide variety of combinations of different sphere sizes may be used in the present invention. For example, each successive layer of spheres may increase or decrease in size, or the size of spheres may alternate in successive layers or every nth layer may vary or an alternating group of layers may be varied. In addition, spheres of different sizes also may be utilized to form a single layer such as in the formation of a binary ($AB_2$) colloidal crystal.

Figure 2A:
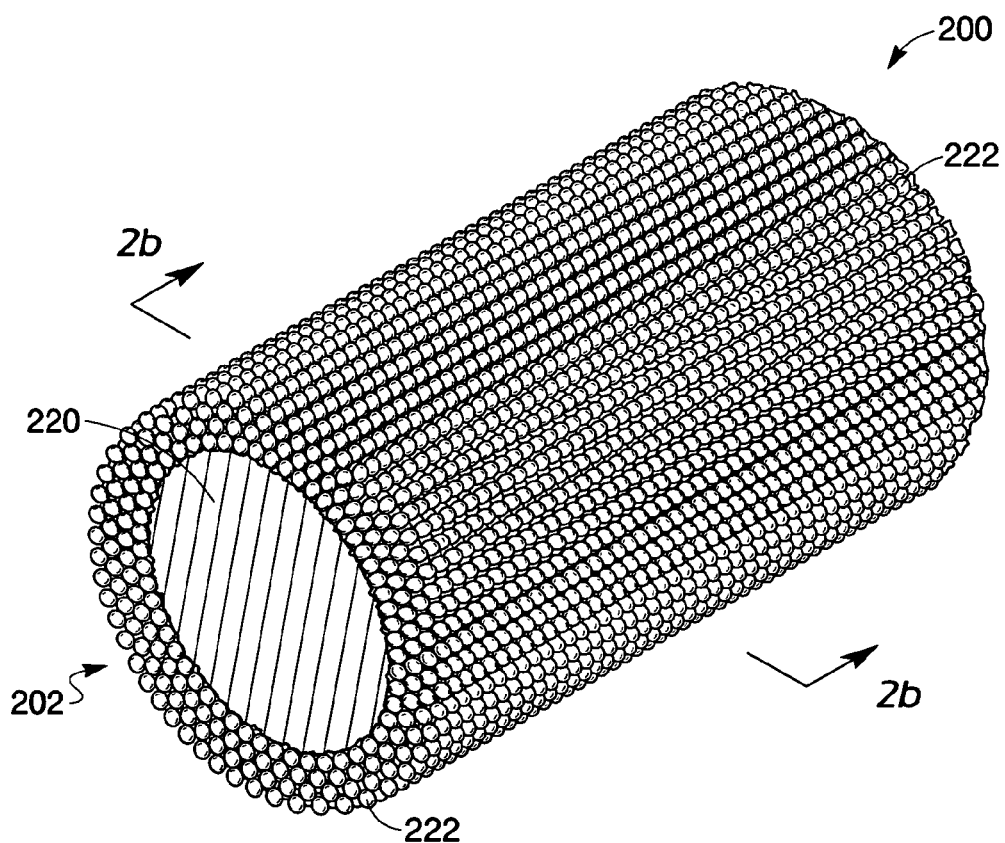
FIG. 2a is a perspective view of a colloidal crystal formed on a cylindrically shaped substrate according to an alternate embodiment of the present invention.
Figure 2B:
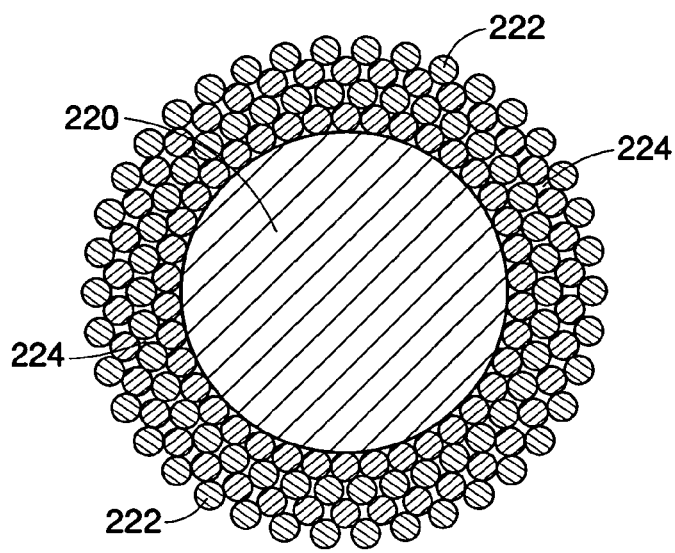

An alternate embodiment of the present invention is shown in a perspective view in FIG. 2a. In this embodiment, apparatus 200 includes substrate 220 having generally a cylindrically shaped outer surface. However, in alternate embodiments, substrate 220 may have any curved shape forming a substantially rod-like substrate. Substrate 220 includes multiple layers of spheres 222 disposed on the outer or external surface of substrate 220 as illustrated in a cross-sectional view in FIG. 2b; however, in alternate embodiments, a single layer of spheres 222 also may be utilized. In this embodiment, the spheres form photonic crystal 202; however, in alternate embodiments, photonic crystal 202 may be formed utilizing an inverse opal structure where interstitial volume 224 between the spheres is infiltrated and filled with a second material with the optional subsequent removal of spheres 222. In one particular embodiment, photonic crystal 202 forms a photonic band gap crystal including inverse opal band gap structures. In still other embodiments, various layers such as an adhesive layer or other layer having particular optical or dielectric properties may be disposed between substrate 220 and photonic crystal 202. In this embodiment, photonic crystal 202 is a coaxial, colloidal crystal tuned to yield a band gap in a desired spectral region. In addition in this embodiment, photonic crystal 202 fully encloses and/or encircles the outer surface of substrate 220. For example, in those embodiments, utilizing a metal wire, such as tungsten, the desired spectral region may be in the infrared or visible portions of the electromagnetic spectrum. In one embodiment, substrate 220 may be a tungsten wire with a tungsten inverse opal structure disposed on the outer surface of substrate 220 forming an incandescent filament. In addition, the wire may be formed into various shapes, such as a spiral shape. In a second embodiment, substrate 220 also may be a tungsten wire with tungsten spheres or other metal with a low vapor pressure at high temperatures forming the colloidal crystal. In still other embodiments, substrate 220 may be an optical fiber where photonic crystal 202 is tuned to reduce the amount of light lost in the optical fiber during use, or substrate 220 may be a lens such as a rod lens.

Figure 3A:
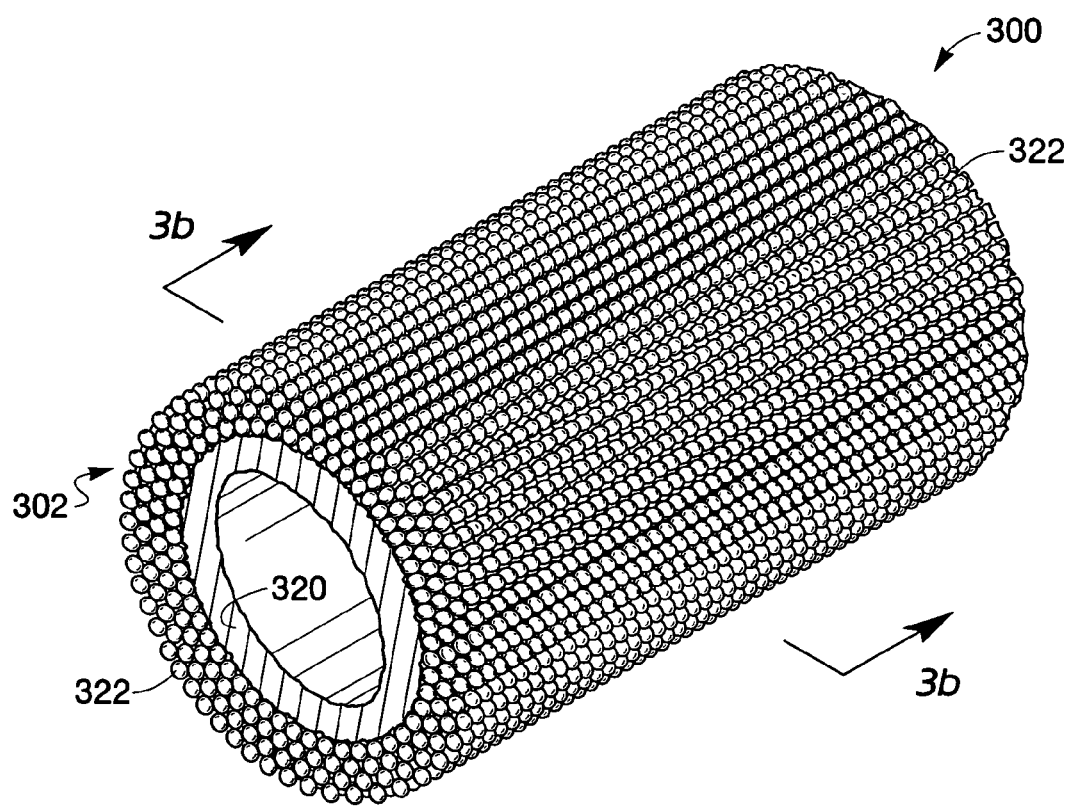
FIG. 3a is a perspective view of a colloidal crystal formed on the outer surface of a tubular shaped substrate according to an alternate embodiment of the present invention.
Figure 3B:
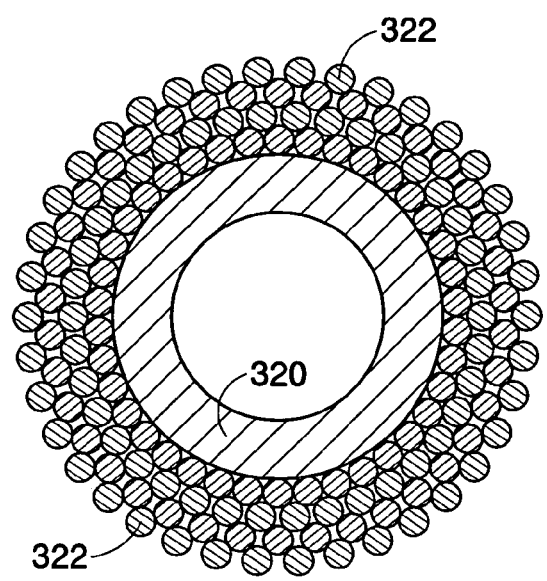
Figure 3C:
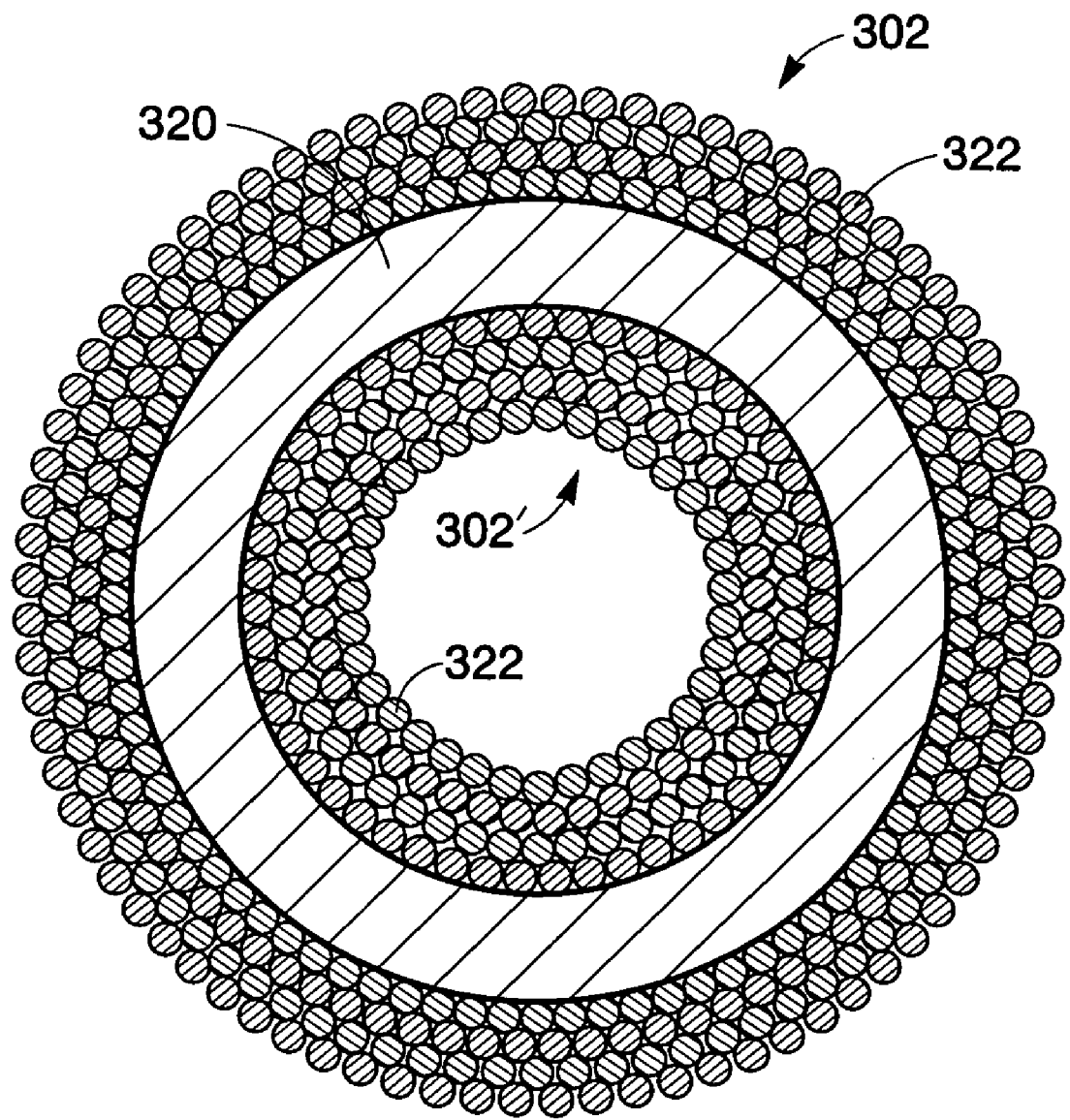
FIG. 3c is a cross-sectional view of a colloidal crystal according to an alternate embodiment of the present invention.

An alternate embodiment of the present invention is shown in a perspective view in FIG. 3a. In this embodiment, apparatus 300 includes substrate 320 having generally a cylindrically shaped tubular structure. However, in alternate embodiments, substrate 320 may have any curved shape forming essentially a tubular-like structure. Substrate 320 includes multiple layers of spheres 322 disposed on the outer or external surface of substrate 320 as illustrated in a cross-sectional view, in FIG. 3b. In this embodiment, the spheres form photonic crystal 302; however, in alternate embodiments, photonic crystal 302 may be formed utilizing an inverse opal structure. In one particular embodiment photonic crystal 302 forms a photonic band gap crystal including inverse opal band gap structures. In still other embodiments, various layers such as an adhesive layer or other layer having particular optical or dielectric properties may be disposed between substrate 320 and photonic crystal 302. In this embodiment, photonic crystal 302 is a colloidal crystal tuned to yield a band gap in a desired spectral region. An alternate embodiment is illustrated in FIG. 3c where substrate 320 includes multiple layers of spheres 322 disposed on both the external surface and the inner or internal surface of substrate 320 to form photonic crystals 302 and 302'. Photonic crystals 302 and 302' illustrated in FIG. 3c may also include inverse opal structures as well as combinations of a colloidal crystal and an inverse opal structure. In addition, the photonic crystals may be formed utilizing spheres having different sizes as previously described for the embodiments shown in FIGS. 1a–1c.

Figure 4:
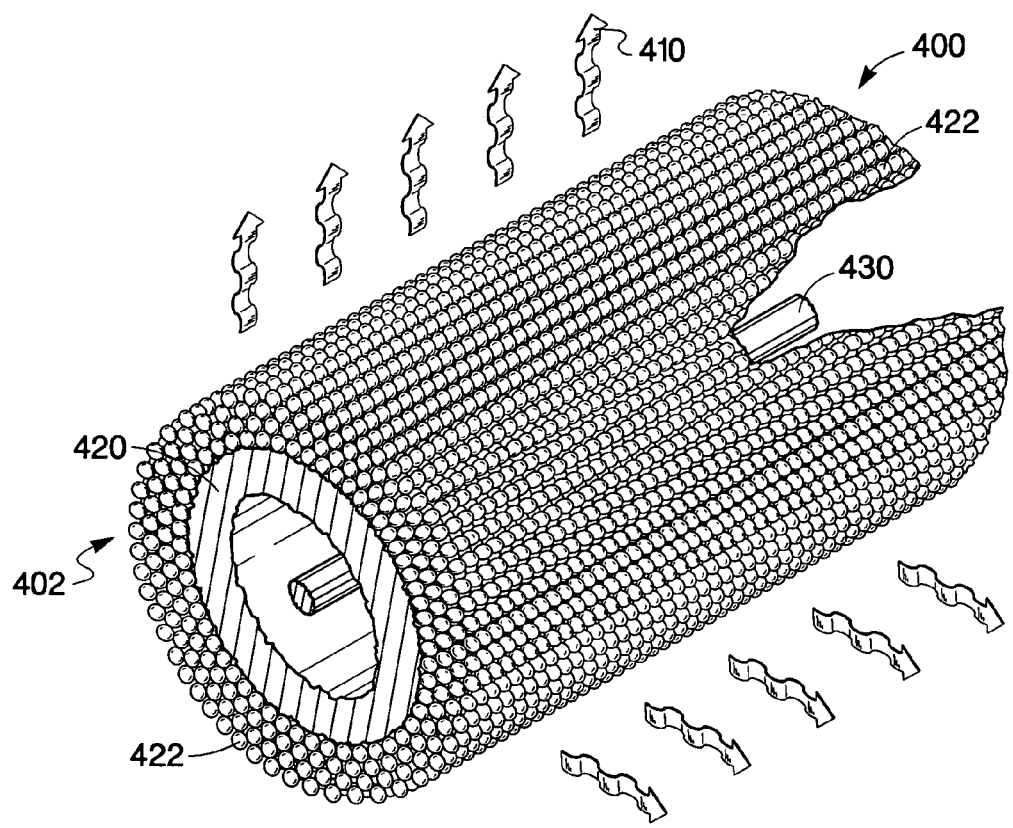
FIG. 4 is a perspective view of an incandescent source according to an embodiment of the present invention.
Figure 5:
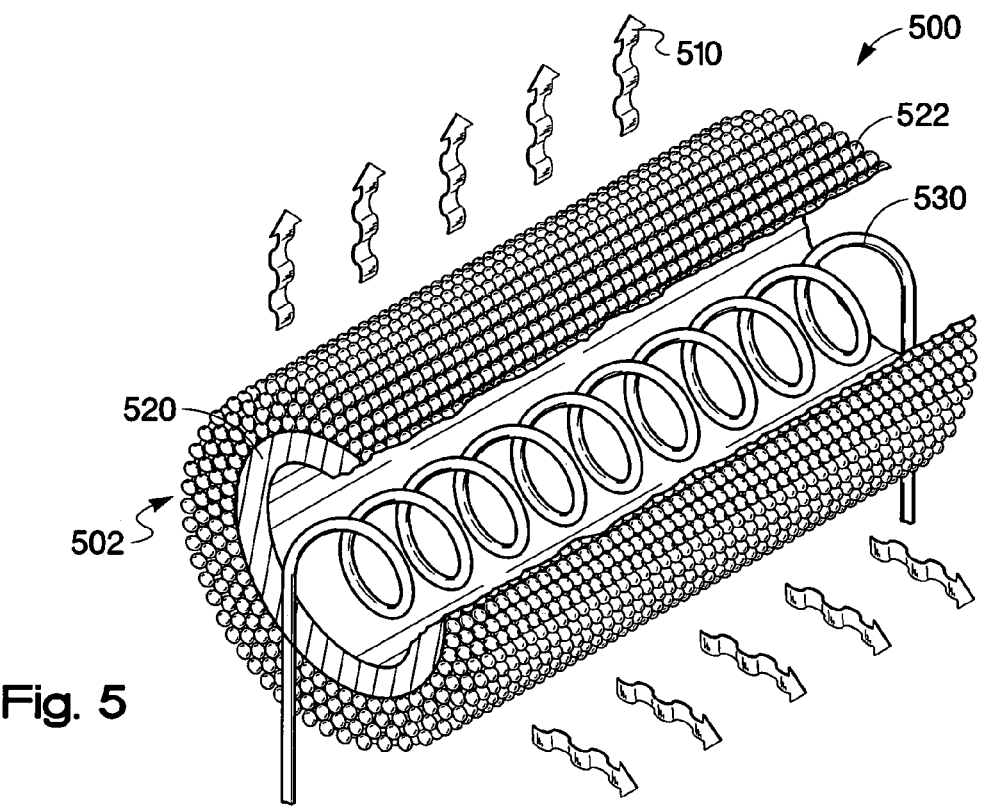
FIG. 5 is a perspective view of an incandescent source according to an alternate embodiment of the present invention.

An alternate embodiment of the present invention is shown in a perspective view in FIG. 4. In this embodiment, apparatus 400 includes filament 430 disposed within, and substantially coaxial with, substrate 420 which has a cylindrically shaped tubular structure. Substrate 420 includes multiple layers of spheres 422 disposed on the outer or external surface of substrate 420; however, in alternate embodiments a single layer of spheres may be utilized. However, in an alternate embodiment, spheres 422 may be disposed on both the external surface and the inner or internal surface of substrate 420 to form multiple photonic crystals. In this embodiment, substrate 420 is sufficiently transparent to provide the desired optical performance; however, in alternate embodiments, substrate 420 may be removed after the formation of the colloidal crystal, such as by etching, so that the optical properties of the substrate would not be important. In this embodiment, the spheres form photonic crystal 402; however, in alternate embodiments, photonic crystal 402 may be formed utilizing an inverse opal structure. In one particular embodiment photonic crystal 402 forms a photonic band gap crystal including inverse opal band gap structures where the photonic crystal is tuned to yield a band gap in a desired spectral region in the infrared or visible region of the electromagnetic spectrum as represented by arrows 410. In one embodiment, filament 430 is a tungsten wire and photonic crystal 402 is tuned to pass visible light providing for an incandescent source having higher efficiency compared to conventional incandescent sources. In alternate embodiments, filament 430 may be formed from other metals, including other refractory metals such as Ta, Mo, and Re, or cermets. In addition, photonic crystal 402, may, for example, be tuned to pass infrared radiation in a desired region. Again providing higher efficiency compared to conventional sources. In still another embodiment of the present invention apparatus 500 includes spiral filament 530 disposed within and substantially coaxial with substrate 520 as illustrated in a perspective view in FIG. 5. Substrate 520 includes multiple layers of spheres 522 disposed on the outer surface of substrate forming photonic crystal 502; however in alternate embodiments, photonic crystal 502 may also be formed utilizing a single layer of spheres or an inverse opal structure. As described previously for the embodiment shown in FIG. 4 the combination of spiral filament 530 and photonic crystal 502 generally provides for more efficient infrared and visible light sources as represented by arrows 510. In still another embodiment, a photonic crystal may be formed directly on the outside surface of the coiled filament where the photonic crystal formed on the filament and the photonic crystal formed on the tubular structure are optimized to provide a more efficient light source.

The colloidal crystals shown in FIGS. 1–5 may be formed by a variety of techniques. For example, sedimentation, and evaporation may be utilized to deposit monolayer and multilayer spheres on a substrate. Two exemplary techniques have been used to form multilayer spheres on convex surfaces. The substrate is suspended and/or immersed in a solution so that the longitudinal axis of the substrate is essentially perpendicular to the meniscus formed by the solution. The solution includes a mixture of spheres and a solvent. For example the solution may include silica spheres or polymeric spheres, such as polystyrene, suspended in an ethanol solvent. Generally, the volume fraction of spheres is in the range from about 1 percent to about 10 percent. A wide variety of solvents may be utilized such as water, ethanol, methanol, propanol, and hexanes. After suspending and/or immersing the substrate in the solution the solution is allowed to evaporate. Depending on the size of spheres and the material utilized to form the spheres the evaporation may be carried out anywhere from room temperature up to just below the boiling point of the solvent. For example, for silica spheres having a diameter less than about 500 nanometers the solution may be evaporated at or near room temperature, whereas for silica spheres having a diameter greater than about 500 nanometers the solution may be evaporated at or near its boiling point. Generally, when the solution is heated above room temperature the vessel holding the solution is enclosed and partially sealed so that the solution may evaporate in a controlled manner and convection currents in the solvent substantially hinder the spheres from settling. The thickness or number of layers of spheres deposited may be controlled by varying the speed of evaporation, the volume fraction of spheres in suspension, or combinations of both. In addition, thicker colloidal crystals also may be formed by carrying out multiple deposition cycles. To hinder the peeling off or partial redispersion of the previously deposited films during subsequent depositions it has been found to be advantageous to sinter the spheres. For example, in those embodiments utilizing silica spheres sintering may be carried out utilizing tetramethyl orthosilicate for several minutes at about 80° C. Another example is to heat silica spheres to about 600° C. to improve the structural integrity of the colloidal crystal without utilizing a sintering agent. In still other embodiments, other sintering agents, times, and temperatures also may be utilized. The particular, sintering agent, time, and temperature is application specific because sintering may affect the filling factor or optical properties of the photonic crystal or various combinations of both. In addition, multilayer colloidal crystals having different colloidal sphere sizes may be formed utilizing multiple depositions. For example, AB, ABA, ABC multilayer crystals may be formed where the letters A, B, and C each represent at least one layer of spheres having a different sphere diameter from the other letters. In still other embodiments, multiple sized spheres also may be utilized in a single solution to generate, for example, binary $AB_2$ crystal structures. Further, the spheres of different sizes may be formed utilizing different materials have different dielectric constants generating a colloidal crystal having a spatially varying dielectric constant. It may also be desirable, depending on the particular application in which the photonic crystal will be utilized, to generate or create portions of the substrate surface free of the spheres. In such embodiments, patterning of the substrate may be generated by selectively applying a sacrificial layer in those areas where it is desired that the spheres do not form. For example, in the embodiment shown in FIG. 4, the internal surface of substrate 420 may be coated or filled with a polyamic acid solution which may be removed at a later time utilizing a solvent such as N,N-dimethylacetamide (DMAC) or N-methyl-2-pyrrolidone (NMP), or a strong basic solution such as potassium hydroxide (KOH). A wide variety of inorganic or organic sacrificial materials may be utilized. The particular material chosen will depend on various factors such as the particular spheres, solvent, and temperature utilized to form the colloidal crystal.

Figure 6A:
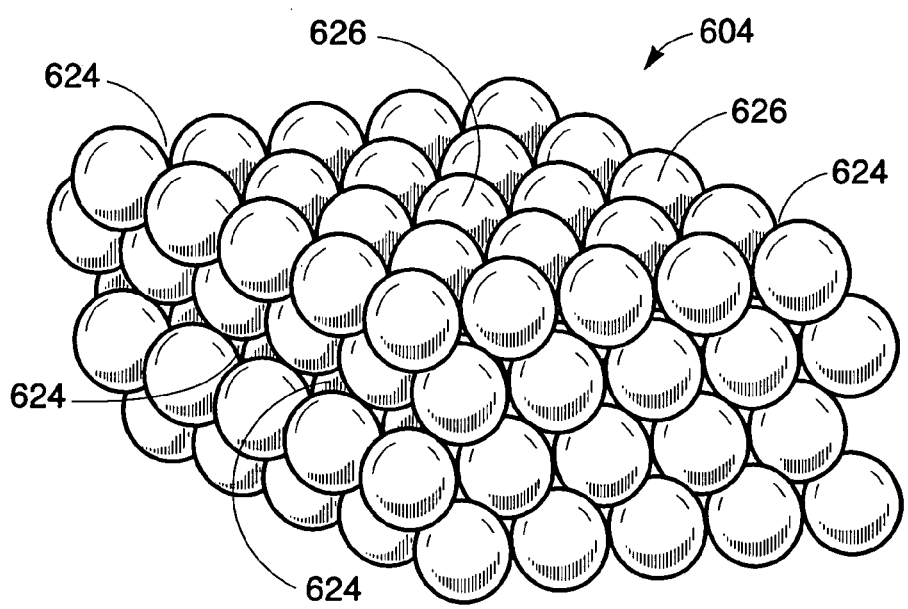
FIG. 6a is a perspective view of a portion of a colloidal crystal according to an embodiment of the present invention.
Figure 6B:
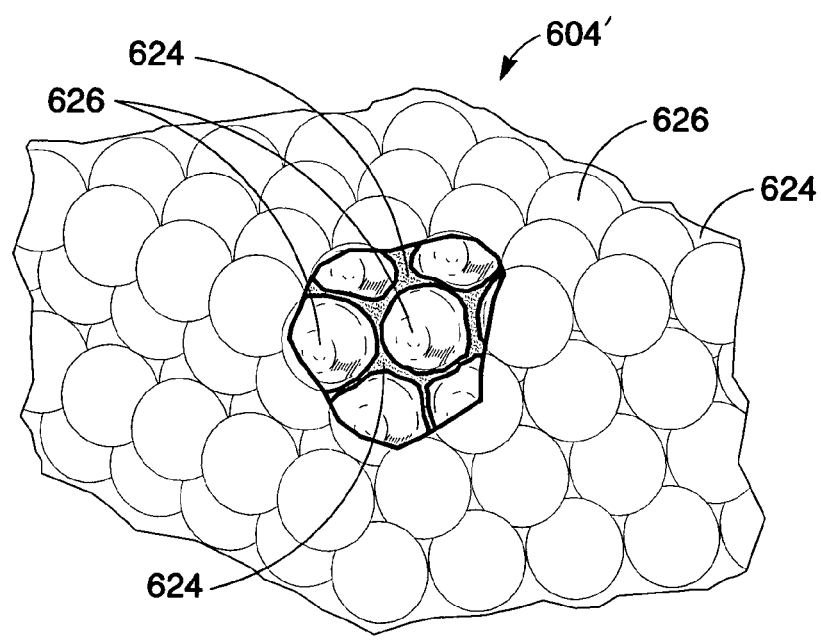
FIG. 6b is a perspective view of a portion of an inverse opal crystal according to an alternate embodiment of the present invention.

For those embodiments utilizing an inverse opal crystal structure a variety of deposition techniques may be utilized to fill the interstitial volume formed between the spheres such as atomic layer deposition (ALD), chemical vapor deposition (CVD), electro-deposition, and electroless deposition and other wet infiltration methods. An exemplary technique utilizes atomic layer deposition to fill or infiltrate the interstitial volume of the colloidal crystal. In one embodiment a tungsten inverse opal structure may be generated utilizing alternating exposures of the colloidal crystal to tungsten hexafluoride ($WF_6$) and silicon hydride (e.g. $SiH_4$, $Si_2H_6$, $Si_3H_8$ and mixtures of various silicon hydrides). The tungsten film growth may be achieved utilizing an alternating sequence of exposures of $WF_6$ and $Si_2H_6$ in the temperature range from about 100° C. to about 400° C. It is believed that the disilane reactant serves a sacrificial role to strip fluorine from tungsten limiting the incorporation of silicon into the film; however, the present invention is not limited to such a mechanism. Other chemistries also may be utilized such as tungsten hexacarbonyl as a tungsten precursor material and boron compounds such as a boron hydride as a reducing agent. In alternate embodiments, other silicon hydrides also may be utilized. In still other embodiments a wide range of inorganic materials also may be utilized. Tungsten nitride, titanium dioxide, graphite, diamond, tungsten carbide, hafnium carbide, and indium phosphide are just a few examples. After the interstitial volume in the crystal is filled or substantially filled the silica spheres may then be removed by soaking in a aqueous hydrofluoric acid solution (i.e. typically about 2 weight percent) to form inverse opal photonic crystal 604 as illustrated in FIG. 6b. FIGS. 6a and 6b illustrate the differences between a colloidal crystal and an inverse opal crystal. FIG. 6a represents a portion of colloidal crystal 604 which has a close-packed geometry; whether the structure is face-centered cubic, hexagonal close-packed or randomly stacked with each sphere 626 touching six other spheres in one layer. Interstitial volume 624 is the volume of the crystal not occupied by spheres 626. FIG. 6b represents a portion of an inverse opal photonic crystal 604' where interstitial volume 624 has been infiltrated or filled with an inorganic material and spheres 626 have been removed. The particular inorganic material utilized will depend on the particular application in which the photonic crystal is utilized. ALD provides an exemplary technique for thin film deposition in deep structures, complex structures, or both. In addition, ALD also provides control in the chemical composition of the deposited film by selection of various precursors, various deposition temperatures and pressures, and combinations of these parameters. Further, the generally low deposition rates (i.e. typically on the order of a few tenths of a nanometer per cycle) allows for a more uniform growth rate and more uniform thickness control in the narrow voids formed in the colloidal crystal providing a cost-effective process to fabricating photonic band gap structures.

What is claimed is:

1. An apparatus, comprising:
    a substrate, wherein at least a portion of said substrate has a convex surface; and
    a colloidal photonic crystal disposed over said convex surface, wherein said colloidal crystal is substantially conformal to at least a portion of said convex surface.

2. The apparatus in accordance with claim 1, wherein said colloidal crystal further comprises:
    a plurality of first spheres having a first diameter; and
    a plurality of second spheres having a second diameter.

3. The apparatus in accordance with claim 2, wherein said colloidal crystal further comprises a first layer having said plurality of first spheres, and a second layer having said plurality of second spheres.

4. The apparatus in accordance with claim 2, wherein said colloidal crystal further comprises a first layer having said plurality of first spheres and an n th layer having said plurality of second spheres, wherein n is an integer greater than one.

5. The apparatus in accordance with claim 2, wherein said colloidal crystal further comprises a first layer having said plurality of first spheres alternating with a second layer having said plurality of second spheres.

6. The apparatus in accordance with claim 2, wherein said colloidal crystal further comprises a first group of layers having said plurality of first spheres alternating with a second group of layers having said plurality of second spheres.

7. The apparatus in accordance with claim 2, wherein said plurality of first spheres and said plurality of second spheres form a binary colloidal crystal.

8. The apparatus in accordance with claim 1, wherein said colloidal crystal further comprises metal spheres.

9. The apparatus in accordance with claim 1, wherein said colloidal crystal further comprises spheres having a differential solubility over an infiltration material.

10. The apparatus in accordance with claim 1, wherein said colloidal photonic crystal further comprises a layer of spheres.

11. The apparatus in accordance with claim 1, wherein said colloidal photonic crystal further comprises photonic band gap crystal.

12. The apparatus in accordance with claim 1, wherein said colloidal photonic crystal further comprises a spatially periodic structure.

13. An apparatus, comprising:
    a substrate, wherein at least a portion of said substrate has a convex surface; and
    an inverse opal crystal structure disposed over said convex surface,
    wherein said inverse opal crystal structure is substantially conformal to at least a portion of said convex surface.

14. The apparatus in accordance with claim 13, wherein said inverse opal crystal structure includes a refractory metal.

15. The apparatus in accordance with claim 1, wherein said convex surface further comprises a substantially cylindrically shaped surface.

16. The apparatus in accordance with claim 15, wherein said substantially cylindrically shaped surface further comprises a filament.

17. The apparatus in accordance with claim 16, wherein said filament further comprises a metal wire.

18. The apparatus in accordance with claim 16, wherein said metal wire further comprises a refractory metal wire.

19. The apparatus in accordance with claim 16, wherein said filament further comprises an optical fiber.

20. The apparatus in accordance with claim 15, wherein said substantially cylindrically shaped surface further comprises a tubularly-shaped structure having an outer surface, wherein said colloidal photonic crystal is disposed over and conformal to at least a portion of said outer surface of said tube.

21. The apparatus in accordance with claim 20, wherein said tubularly shaped substrate is substantially optically transparent in the visible portion of the electromagnetic spectrum.

22. The apparatus in accordance with claim 20, further comprising a metal wire disposed at least partially within said tubularly shaped substrate.

23. The apparatus in accordance with claim 22, wherein said metal wire further comprises a spirally wound metal wire filament.

24. The apparatus in accordance with claim 23, wherein said spirally wound metal wire filament further comprises a photonic crystal conformal to and disposed on at least a portion of said spirally wound metal wire filament.

25. The apparatus in accordance with claim 1, wherein said convex surface forms at least a portion of an optical component such as a lens.

26. The apparatus in accordance with claim 25, where in said lens further comprises a rod lens.

27. The apparatus in accordance with claim 1, wherein said substrate further comprises a tubularly shaped substrate having at least a portion of an external surface of said tubularly substrate forming said convex surface.

28. The apparatus in accordance with claim 27, wherein said colloidal photonic crystal is disposed over and conformal to said external surface of said tubularly shaped substrate.

29. The apparatus in accordance with claim 28, further comprising a metal wire disposed at least partially within said tubularly shaped substrate.

30. The apparatus in accordance with claim 29, wherein said metal wire further comprises a spirally wound metal wire filament.

31. The apparatus in accordance with claim 30, wherein said spirally wound metal wire filament further comprises a photonic crystal conformal to and disposed on at least a portion of said spirally wound metal wire filament.

32. The apparatus in accordance with claim 1, wherein said substrate further comprises a rod-like substrate.

33. The apparatus in accordance with claim 32, wherein said rod-like structure further comprises a filament.

34. The apparatus in accordance with claim 33, wherein said filament further comprises a metal wire.

35. The apparatus in accordance with claim 34, wherein said metal wire further comprises a refractory metal wire.

36. The apparatus in accordance with claim 33, wherein said metal wire further comprises a spatially wound metal wire.

37. The apparatus in accordance with claim 36, wherein said spirally wound metal wire further comprises a photonic crystal conformal to and disposed on at least a portion of said spirally wound metal wire.

38. The apparatus in accordance with claim 1, wherein said substrate further comprises said substrate having an external closed surface.

39. The apparatus in accordance with claim 1, wherein said substrate further comprises a conically-shaped substrate.

40. The apparatus in accordance with claim 1, wherein said substrate further comprises a spherically-shaped substrate.

41. The apparatus in accordance with claim 1, wherein said substrate further comprises cylindrically-shaped substrate having a cylindrical axis, wherein said colloidal photonic crystal substantially encircles said cylindrical axis.

42. The apparatus in accordance with claim 41, further comprising an inner photonic crystal disposed on an internal surface of said cylindrically shaped substrate, wherein said inner photonic crystal substantially encircles said cylindrical axis.

43. The apparatus in accordance with claim 41, further comprising a metal wire disposed in said cylindrically-shaped substrate and substantially coaxial with said cylindrical axis.

44. A method of manufacturing a photonic crystal, comprising forming an inverse opal photonic crystal over at least a portion of a convex surface, wherein the inverse opal photonic crystal is conformal to at least a portion of said convex surface.

45. A method of manufacturing a photonic apparatus, further comprising:
forming two or more layers of spheres over and conformal to a convex surface of a substrate; and
forming a second material in said void spaces.

46. The method in accordance with claim 45, further comprising substantially filling said void spaces with said second material.

47. The method in accordance with claim 46, further comprising removing said spheres to form an inverse opal crystal.

48. The method in accordance with claim 45, wherein said spheres have a sphere dielectric constant and said second material has a dielectric constant different from said sphere dielectric constant.

49. The method in accordance with claim 45, further comprising immersing said convex surface in a mixture of spheres and a solvent.

50. The method in accordance with claim 49, wherein immersing said convex surface further comprises immersing said convex surface so that a long axis of said convex surface is substantially perpendicular to a meniscus formed by said mixture.

51. The method in accordance with claim 45, further comprising suspending said convex surface in a mixture of spheres and a solvent.

52. The method in accordance with claim 51, wherein suspending said convex surface further comprises suspending said convex surface so that a long axis of said convex surface is substantially perpendicular to a meniscus formed by said mixture.

53. The method in accordance with claim 45, further comprising cleaning said convex surface.

54. The method in accordance with claim 45, wherein forming at least one layer of spheres further comprises forming at least one layer of spheres utilizing a mixture of spheres in a solvent.

55. The method in accordance with claim 54, further comprising removing said solvent.

56. The method in accordance with claim 55, wherein removing said solvent further comprises evaporating said solvent.

57. The method in accordance with claim 45, further comprising forming a sacrificial layer over at least a portion of a substrate that forms said convex surface.

58. The method in accordance with claim 45, further comprising etching a substrate that forms said convex surface.

59. A method of using an inverse opal photonic crystal, comprising transmitting at least a portion of the electromagnetic spectrum through a convex surface forming at least a portion of the inverse opal photonic crystal.

60. The method in accordance with claim 59, further comprising heating an incandescent filament, wherein at least a portion of the inverse opal photonic crystal encircles said incandescent filament.

61. The method in accordance with claim 60, wherein the inverse opal photonic crystal is disposed on said incandescent filament.

62. The method in accordance with claim 61, wherein said incandescent filament includes a refractory metal.

63. The method in accordance with claim 60, wherein the inverse opal photonic crystal further comprises a tubularly-shaped inverse opal photonic crystal, and said incandescent filament is disposed within said tubularly-shaped inverse opal photonic crystal.

64. An apparatus, comprising:
  substrate, wherein at least a portion of said substrate has a convex surface; and
  means for forming a colloidal photonic crystal disposed over and substantially conformal to said convex surface.

65. The apparatus in accordance with claim 64, wherein said means for forming said colloidal photonic crystal further comprises forming a polymeric colloidal crystal.

66. The apparatus in accordance with claim 64, wherein said means for forming said colloidal photonic crystal further comprises forming a photonic band gap crystal.

67. The apparatus in accordance with claim 66, wherein said means for forming said colloidal photonic crystal further comprises forming a refractory metal colloidal photonic crystal.

* * * * *

UNITED STATES PATENT AND TRADEMARK OFFICE
CERTIFICATE OF CORRECTION

PATENT NO. : 7,085,038 B1
APPLICATION NO. : 11/046586
DATED : August 1, 2006
INVENTOR(S) : Herbert Thomas Etheridge, III et al.

It is certified that error appears in the above-identified patent and that said Letters Patent is hereby corrected as shown below:

In column 8, line 20, in Claim 4, delete "n th layer" and insert -- nth layer --, therefor.

In column 8, line 45, in Claim 11, after "comprises" insert -- a --.

In column 9, line 29, in Claim 26, delete "where in" and insert -- wherein --, therefor.

In column 9, line 34, in Claim 27, after "tubularly" insert -- shaped --.

In column 9, line 59, in Claim 36, delete "spatially" and insert -- spirally --, therefor.

In column 10, line 27, in Claim 45, delete "further" before "comprising".

Signed and Sealed this

Seventeenth Day of March, 2009

JOHN DOLL
*Acting Director of the United States Patent and Trademark Office*